(12) United States Patent
Kang et al.

(10) Patent No.: US 10,062,363 B2
(45) Date of Patent: Aug. 28, 2018

(54) APPARATUS AND METHOD FOR REDUCING IMAGE STICKING IN A MOBILE TERMINAL

(71) Applicant: LG ELECTRONICS INC., Seoul (KR)

(72) Inventors: Jeonghoon Kang, Seoul (KR); Heesoo Kang, Seoul (KR); Taeyun Kim, Seoul (KR); Taejoo Kim, Seoul (KR); Doochan Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/025,848

(22) PCT Filed: Jan. 9, 2014

(86) PCT No.: PCT/KR2014/000227
§ 371 (c)(1),
(2) Date: Mar. 29, 2016

(87) PCT Pub. No.: WO2015/060501
PCT Pub. Date: Apr. 30, 2015

(65) Prior Publication Data
US 2016/0217770 A1 Jul. 28, 2016

(30) Foreign Application Priority Data

Oct. 21, 2013 (KR) .......................... 10-2013-0125399

(51) Int. Cl.
*G09G 5/38* (2006.01)
*G06F 3/01* (2006.01)
(Continued)

(52) U.S. Cl.
CPC ................. *G09G 5/38* (2013.01); *G06F 3/01* (2013.01); *G06F 3/013* (2013.01); *G09G 3/20* (2013.01);
(Continued)

(58) Field of Classification Search
CPC ..... G06F 2001/133397; G06F 3/04845; G06F 2200/1614; G06F 3/0346; G09G 5/38;
(Continued)

(56) References Cited

U.S. PATENT DOCUMENTS

2008/0111833 A1* 5/2008 Thorn .................. G09G 5/00
345/690
2008/0170058 A1* 7/2008 Ahn ...................... H04N 7/141
345/211
(Continued)

FOREIGN PATENT DOCUMENTS

KR 20080067461 7/2008
KR 20100050823 5/2010
(Continued)

OTHER PUBLICATIONS

PCT International Application No. PCT/KR2014/000227, International Search Report dated Jul. 14, 2014, 2 pages.

*Primary Examiner* — Diane Wills
(74) *Attorney, Agent, or Firm* — Lee, Hong, Degerman, Kang & Waimey

(57) ABSTRACT

The present invention relates to a mobile terminal and a method for controlling the same which can effectively reduce an afterimage phenomenon generated on a display unit. A control apparatus of a mobile terminal for reducing an afterimage of a display unit of the mobile terminal according to embodiments of the present invention may comprise: the display unit for displaying items in a turned-on state; and a control unit for turning off the display unit
(Continued)

after displaying the items on the display unit, moving display locations of the items displayed on the display unit in the turned-on state in a state where the display unit is turned off, and displaying the items in the moved display locations when the display unit is turned back on.

20 Claims, 13 Drawing Sheets

(51) Int. Cl.
    *H04B 1/40*     (2015.01)
    *G09G 3/20*     (2006.01)
    *G09G 5/36*     (2006.01)

(52) U.S. Cl.
    CPC ............... *G09G 5/363* (2013.01); *H04B 1/40* (2013.01); *G09G 2310/0245* (2013.01); *G09G 2320/0257* (2013.01); *G09G 2340/0464* (2013.01); *G09G 2354/00* (2013.01); *G09G 2370/22* (2013.01)

(58) Field of Classification Search
    CPC ..... G09G 2310/0245; G09G 2320/048; G09G 2320/0257; G09G 2340/0464–2340/0485; G09G 2340/0492; G06T 3/60; G06K 9/3208
See application file for complete search history.

(56) References Cited

U.S. PATENT DOCUMENTS

| | | | | |
|---|---|---|---|---|
| 2010/0125819 | A1* | 5/2010 | Sudhakar | G06F 3/0481 715/867 |
| 2010/0214216 | A1* | 8/2010 | Nasiri | A63F 13/06 345/158 |
| 2012/0236040 | A1* | 9/2012 | Eom | G09G 3/007 345/681 |
| 2012/0331546 | A1* | 12/2012 | Falkenburg | G06F 3/03545 726/16 |
| 2013/0162684 | A1* | 6/2013 | Williams | G09G 5/363 345/650 |
| 2013/0176222 | A1* | 7/2013 | Tanaka | G06F 3/033 345/158 |
| 2015/0161936 | A1* | 6/2015 | Jang | G09G 3/20 345/214 |

FOREIGN PATENT DOCUMENTS

| | | |
|---|---|---|
| KR | 20120106558 | 9/2012 |
| KR | 20130032994 | 4/2013 |
| KR | 20130102918 | 9/2013 |

* cited by examiner

APPARATUS AND METHOD FOR REDUCING IMAGE STICKING IN A MOBILE TERMINAL

CROSS-REFERENCE TO RELATED APPLICATIONS

This application is the National Stage filing under 35 U.S.C. 371 of International Application No. PCT/KR2014/000227, filed on Jan. 9, 2014, which claims the benefit if earlier filing date and right of priority of Korean Application No. 10-2013-0125399, filed on Oct. 21, 2013, the contents of which are all hereby incorporation by reference herein in their entirety.

BACKGROUND OF THE INVENTION

1. Field of the Invention

The present invention relates to a control apparatus of a mobile terminal and a control method thereof.

2. Background of the Invention

In general, a mobile terminal (portable electronic device) is a portable electronic device having at least one of a voice and video communication function, an information input and/output function, a data storage function, and the like. As the function becomes diversified, the mobile terminal is implemented in the form of a multimedia player having complicated functions such as capturing still or moving images, playing music or video files, gaming, receiving broadcast, and the like. Furthermore, when an image is consistently displayed at a fixed position on a display unit applied to the mobile terminal or the like for a long period of time, image sticking phenomenon may occur.

SUMMARY OF THE INVENTION

An object of the present invention is to provide a mobile terminal and a control method thereof capable of effectively reducing image sticking phenomenon occurring on a display unit.

According to the embodiments of the present disclosure, there is disclosed a control apparatus of a mobile terminal for reducing image sticking on a display unit of the mobile terminal, and the control apparatus may include a display unit configured to display items in a turn-on state; and a controller configured to display the items on the display unit and then turn off the display unit, and move the display position of the items displayed on the display unit in the turn-on state in a state that the display unit is turned off, and display the items at the moved display position when the display unit is turned back on.

For an example associated with the present disclosure, the controller may count a turn-off number of times of the display unit, and sequentially move the display position of the items according to the counted number of times.

For an example associated with the present disclosure, the items may be icons indicating the current status information of the mobile terminal.

For an example associated with the present disclosure, the icons may include at least one of a mobile communication network reception sensitivity display icon, a long term evolution (LTE) or WiFi reception sensitivity display icon, a current time display icon, a battery information display icon, an alarm setting display icon, a Bluetooth status display icon, and a global positioning system (GPS) status display icon.

For an example associated with the present disclosure, the controller may display a preset image for reducing image sticking instead of a home image containing the items for a preset period of time, and move the display position of the items, and display the items at the moved display position when the preset period of time has passed.

For an example associated with the present disclosure, the controller may display a preset image for a preset period of time instead of a first image corresponding to a region containing the items to reduce image sticking, and move the display position of the items, and display the items at the moved display position when the preset period of time has passed.

For an example associated with the present disclosure, the controller may periodically display only partial items of the items on the display unit, and periodically change the display position of the partial items.

For an example associated with the present disclosure, the controller may move the display position of the items by a preset distance whenever a screen vertical view mode or screen horizontal view mode of the mobile terminal is selected.

For an example associated with the present disclosure, the control apparatus may further include a sensing unit configured to sense an acceleration of the mobile terminal, wherein the controller moves the display position of the items by a preset distance whenever the sensed acceleration exceeds a preset reference value.

For an example associated with the present disclosure, the controller may detect a user's line of sight through a camera, and display the items at the moved display position only when the detected user's line of sight does not face a screen of the display unit.

For an example associated with the present disclosure, the control apparatus may further include a wireless communication unit configured to receive information, wherein the controller changes the display position of the items when the information is received.

For an example associated with the present disclosure, the controller may move the display position of the items by a preset distance whenever a text or call signal is received through the wireless communication unit.

According to the embodiments of the present disclosure, there is disclosed a method for reducing image sticking on a display unit of a mobile terminal, and the method may include displaying items on the display unit in a turn-on state; displaying the items on the display unit and then turning off the display unit; moving the display position of the items displayed on the display unit in the turn-on state in a state that the display unit is turned off; and displaying the items at the moved display position when the display unit is turned on.

A control apparatus of a mobile terminal and a control method thereof according to the embodiments of the present disclosure may display at least one or more items on a display unit in a turn-on state and then turn off the display unit, and move the display position of the at least one or more items displayed on the display unit in the turn-on state when the display unit is turned off, and display the at least one or more items at the moved display position when the display unit is turned back on, thereby effectively reducing the image sticking of the mobile terminal.

A control apparatus of a mobile terminal and a control method thereof according to the embodiments of the present disclosure may display a preset image for reducing for reducing image sticking instead of a home image containing at least one or more items for a preset period of time, and move the display position of the at least one or more items, and display the at least one or more items at the moved display position when the preset period of time has passed, thereby effectively reducing the image sticking of the mobile terminal.

A control apparatus of a mobile terminal and a control method thereof according to the embodiments of the present disclosure may change the display position of the at least one or more items whenever a screen vertical view mode or screen horizontal view mode of the mobile terminal is selected, thereby effectively reducing the image sticking of the mobile terminal.

A control apparatus of a mobile terminal and a control method thereof according to the embodiments of the present disclosure may move the display position of the at least one or more items by a preset distance whenever a screen vertical view mode or screen horizontal view mode of the mobile terminal is selected, thereby effectively reducing the image sticking of the mobile terminal.

A control apparatus of a mobile terminal and a control method thereof according to the embodiments of the present disclosure may detect a user's line of sight through a camera, and display the items at the moved display position only when the detected user's line of sight does not face a screen of the display unit, thereby effectively reducing the image sticking of the mobile terminal while disallowing a user to recognize the movement of the items.

A control apparatus of a mobile terminal and a control method thereof according to the embodiments of the present disclosure may display the items at the moved display position whenever a text or call signal is received through the wireless communication unit, thereby effectively reducing the image sticking of the mobile terminal.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
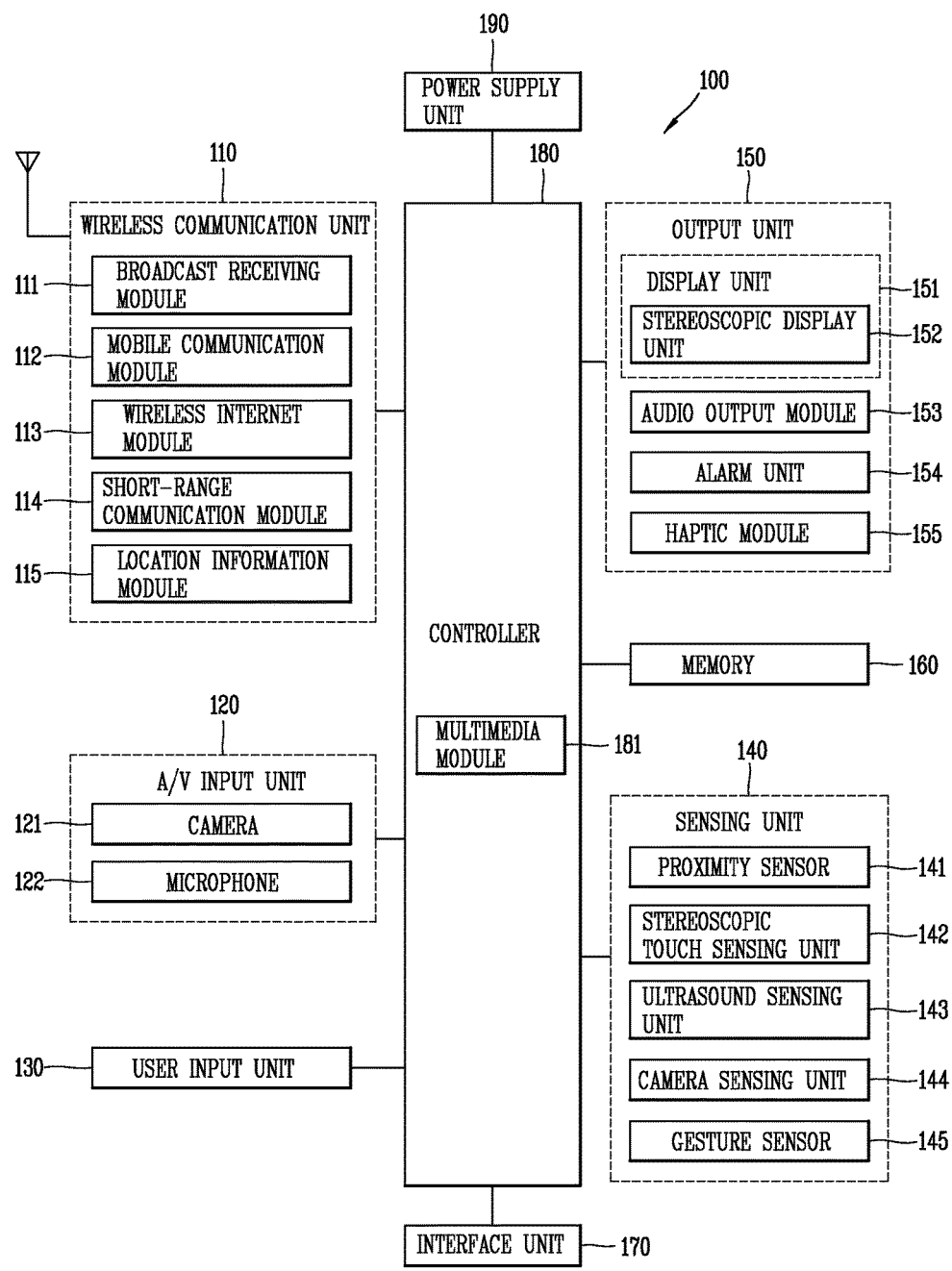
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a mobile phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The maximum object recognition (sensing) distance of the proximity sensor 141 may be 4-5 cm.

Hereinafter, for the sake of convenience of brief explanation, a behavior that the pointer is positioned to be proximate onto the touch screen without contact will be referred to as a "floating touch or proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity touch sensor (not shown) may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor. In other words, the touch screen (touch sensor) may include a contact touch sensor for sensing a contact touch and a proximity touch sensor for sensing a proximity touch (or non-contact touch). The maximum object recognition (sensing) distance of the proximity touch sensor may be 1-2 cm.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity touch sensor and the proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The sensing unit 140 may further include a gesture sensor 145, and the gesture sensor 145 as a sensor for sensing a gesture senses various gestures such as a shape of a hand, a shape of a finger, a movement of a hand, and the like. The maximum object recognition (sensing) distance of the gesture sensor 145 may be 15-30 cm.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the users control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
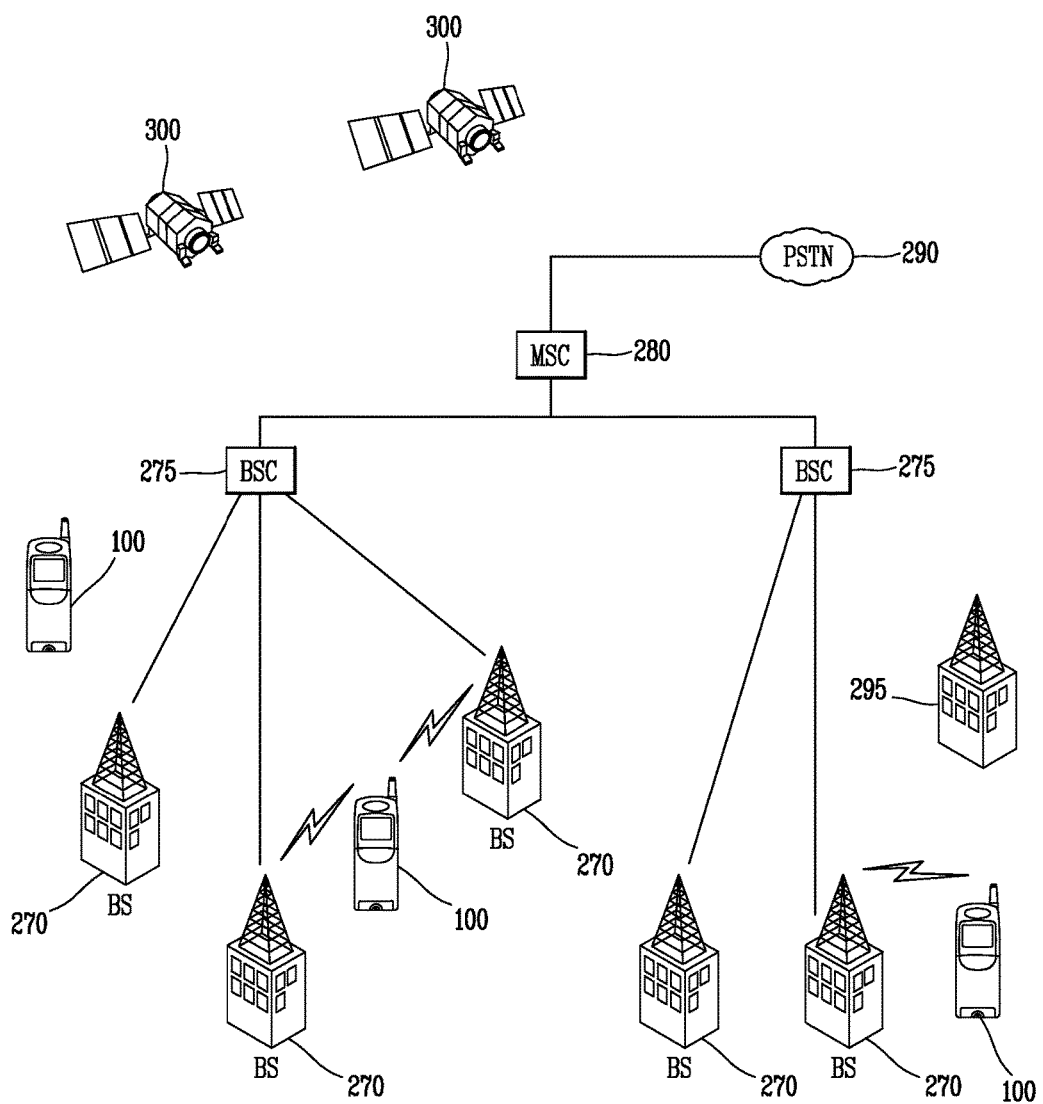
FIGS. 2A and 2B are conceptual views illustrating a communication system on which a mobile terminal according to the present disclosure is operable.
Figure 2B:
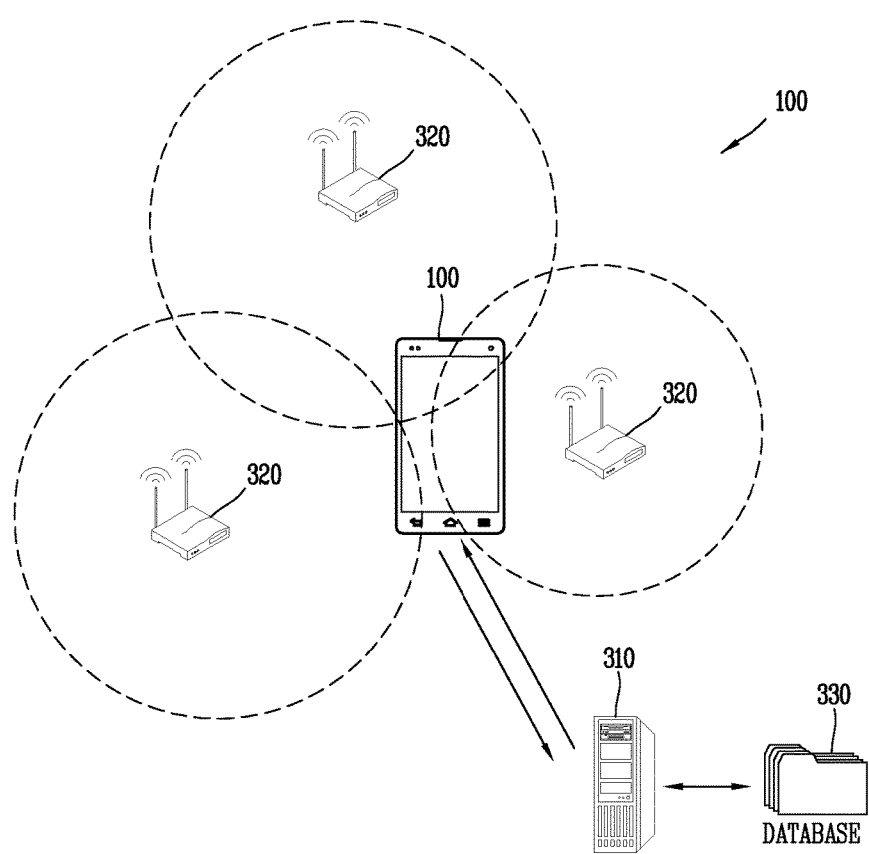

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

When a positionally fixed image is consistently displayed on the display unit 151 for a long period of time, image sticking phenomenon occurs in which the fixed image remains as it is. In case of a thin film transistor liquid crystal display (TFT-LCD), image sticking may occur due to the fixation of liquid crystals to the fixed image, but in case of an active matrix organic light-emitting diode (AMOLED), the light emitting efficiency of a pixel for emitting light to display the fixed image reduces according to the passage of time, and the diode emits light at a relatively low brightness than that of the adjoining pixel, thereby causing image sticking phenomenon.

Hereinafter, a control apparatus of a mobile terminal and a control method thereof capable of reducing image sticking phenomenon that may occur on an apparatus (for example, mobile terminal, television, monitor, etc.) using an active matrix organic light-emitting diode (AMOLED) as a display unit will be described.

According to the present disclosure, an "item" may correspond to an image object, an application execution icon, or the like indicating the current status information of the mobile terminal 100. When the display unit 151 constitutes a mobile terminal, an image object indicating the current status information of the mobile terminal 100 may be a mobile communication network reception sensitivity display icon, a long term evolution (LTE) or WiFi reception sensitivity display icon, a current time display icon, a battery information display icon, an alarm setting display icon, a Bluetooth status display icon, a global positioning system (GPS) status display icon, and the like.

Figure 3:
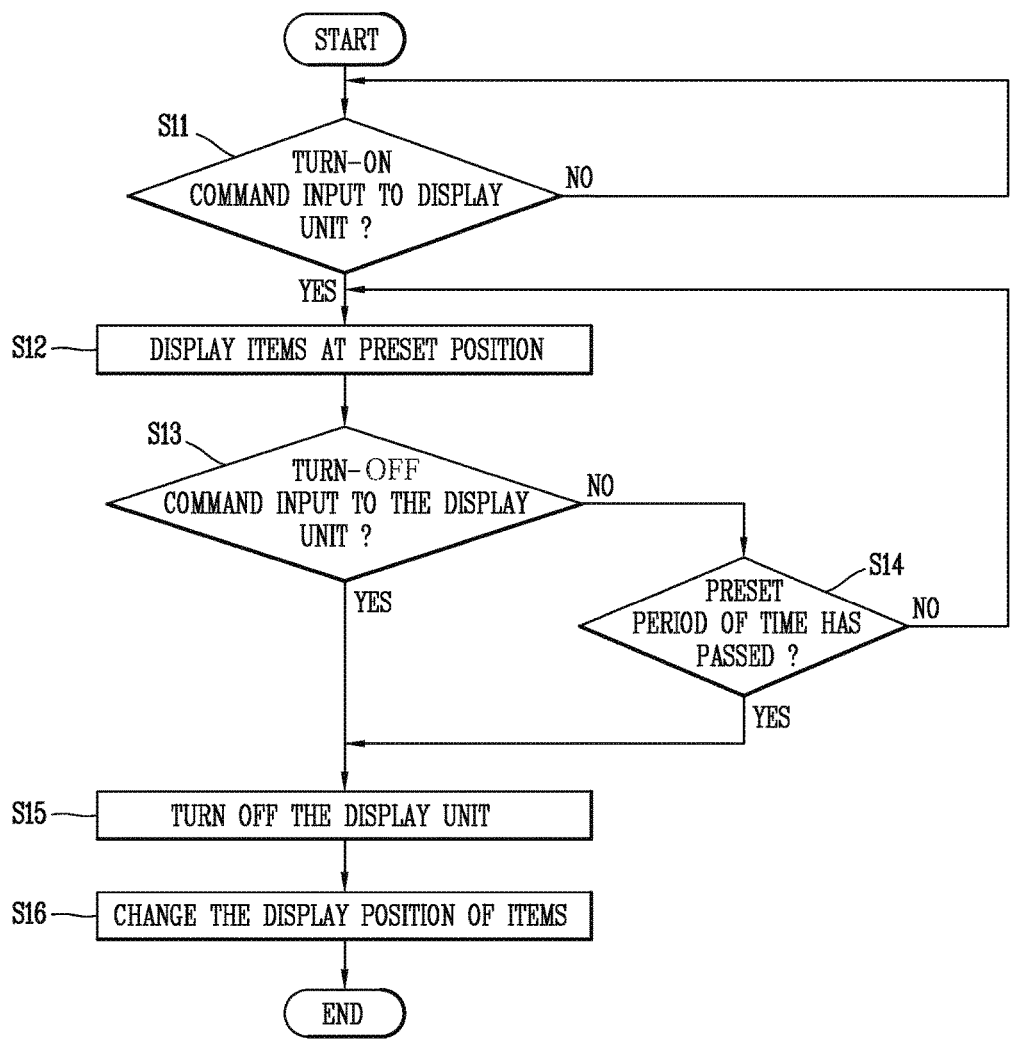
FIG. 3 is a flow chart illustrating a control method of a mobile terminal according to a first embodiment of the present disclosure.

FIG. 3 is a flow chart illustrating a control method of a mobile terminal according to a first embodiment of the present disclosure.

First, the controller 180 determines (decides) whether or not a turn-on command of the display unit 151 is entered through the input unit 130 (S11). A user may presses a turn-on/turn-off button key of the display unit 151 to enter a turn-on/turn-off command of the display unit 151. The controller 180 may recognizes a user's voice to turn on or off the display unit 151. The controller 180 may turn on or off the display unit 151 based on a preset user gesture entered through the camera 121 or gesture sensor 145. The controller 180 may automatically turn on or off the display unit 151 for each preset period of time.

When a turn-on command of the display unit 151 is received, the controller 180 turns on the display unit 151, and displays at least one item at a preset position on the display unit 151 (S12). When the at least one item is displayed on the display unit 151, the controller 180 may arrange and display them in a row in a predetermined region of the display unit 151. For example, the controller 180 may arrange and display items in a horizontal direction in a region having a predetermined thickness from an upper end of the display unit 151.

The controller 180 displays at least one item at a preset position on the display unit 151 and then determines (decides) whether or not a command for turning off the display unit 151 is entered (S13).

When a command for turning off the display unit 151 is entered, the controller 180 turns off the display unit 151 to reduce the image sticking phenomenon (S15). On the contrary, when a preset period of time (for example, 1 hour) for reducing the image sticking phenomenon has passed, the controller 180 may turn off the display unit 151 (S14).

The controller 180 turns off the display unit 151, and then changes the display position of at least one item displayed on the display unit 151 in the turn-on state according to a turn-off number of times of the display unit 151 (S16). The controller 180 counts the turn-on/turn-off number of times of the display unit 151, and accumulates the counted number of times. For example, the controller 180 moves the display position of the at least one item displayed on the display unit 151 in the turn-on state by a preset distance (for example, 1 pixel to 5 pixels) as the turn-off number of times of the display unit 151 increases.

Figure 4:
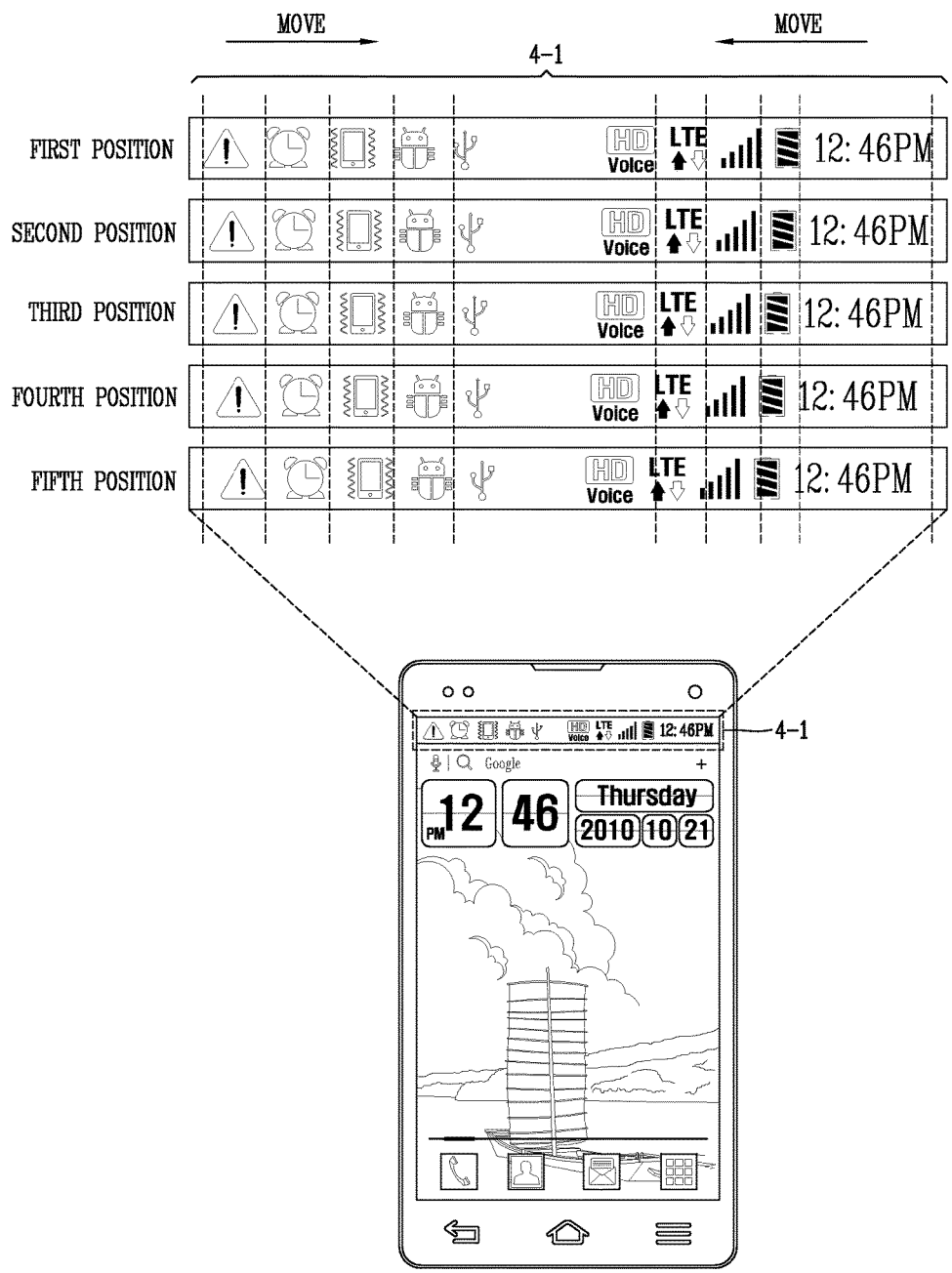
FIG. 4 is an exemplary view illustrating a method of changing (moving) the display position of at least one item according to a first embodiment of the present disclosure.

FIG. 4 is an exemplary view illustrating a method of changing (moving) the display position of at least one item according to a first embodiment of the present disclosure.

As illustrated in FIG. 4, the controller 180 may move the entire items arrangement (items arrangement displayed on a notification bar at an upper end thereof) including at least one item. For example, when a plurality of items are arranged in one row in a horizontal direction, the controller 180 may move the entire items to the left or right side whenever the turn-off number of times of the display unit 151 increases. The controller 180 may move part of the entire items 4-1 to the left side and the remaining part thereof to the right side whenever the turn-off number of times of the display unit 151 increases. The items 4-1 as icons indicating the current status information of the mobile terminal 100 may include a mobile communication network reception sensitivity display icon, a long term evolution (LTE) or WiFi reception sensitivity display icon, a current time display icon, a battery information display icon, an alarm setting display icon, a Bluetooth status display icon, a global positioning system (GPS) status display icon, and the like.

The controller 180 may move the items 4-1 from an initial position to a first position when the turn-off number of times of the display unit 151 is once, and move the items 4-1 from the first position to a second position when the turn-off number of times of the display unit 151 is twice, and move the items 4-1 from the second position to a third position when the turn-off number of times of the display unit 151 is three times, and move the items 4-1 from the third position to a fourth position when the turn-off number of times of the display unit 151 is four times, and move the items 4-1 from the fourth position to a fifth position when the turn-off number of times of the display unit 151 is five times.

The controller 180 may repeatedly move the items 4-1 from a fifth position to a first position and from the first position to the fifth position in a sequential manner whenever the turn-off number of times of the display unit 151 increases one over five times or repeatedly move the items 4-1 from a first position to a fifth position in a sequential manner whenever the turn-off number of times of the display unit 151 increases one over five times.

The controller 180 may move items along a predetermined path whenever the turn-off number of times of the display unit 151 increases. For example, when the items are arranged in a horizontal direction, the controller 180 may move items by a pixel unit within a range of two pixels in the left side and two pixels in the right side whenever the display unit 151 is turned off from the turn-on state. When a reference position when initial items are displayed is (0, 0), the controller 180 may move the items in the sequence of (−1, 0), (−2, 0), (−1, 0), (0, 0), (+1, 0), (+2, 0), (+1, 0) and (0, 0). According to an embodiment, the reference point may correspond to the uppermost left position of the displayed items. Furthermore, the reference point may correspond to the center, the lowermost left, the uppermost right or the lowermost right, and the like of the items.

The controller 180 may move items by a pixel unit within a range of one pixel in the left side, one pixel in the right side, one pixel in the upward direction and one pixel in the downward direction whenever the display unit 151 is turned off from the turn-on state. When a reference position when initial items are displayed is (0, 0), the controller 180 may move the items in the sequence of (−1, 0), (−1, −1), (0, −1), and (0, 0).

Figure 5:
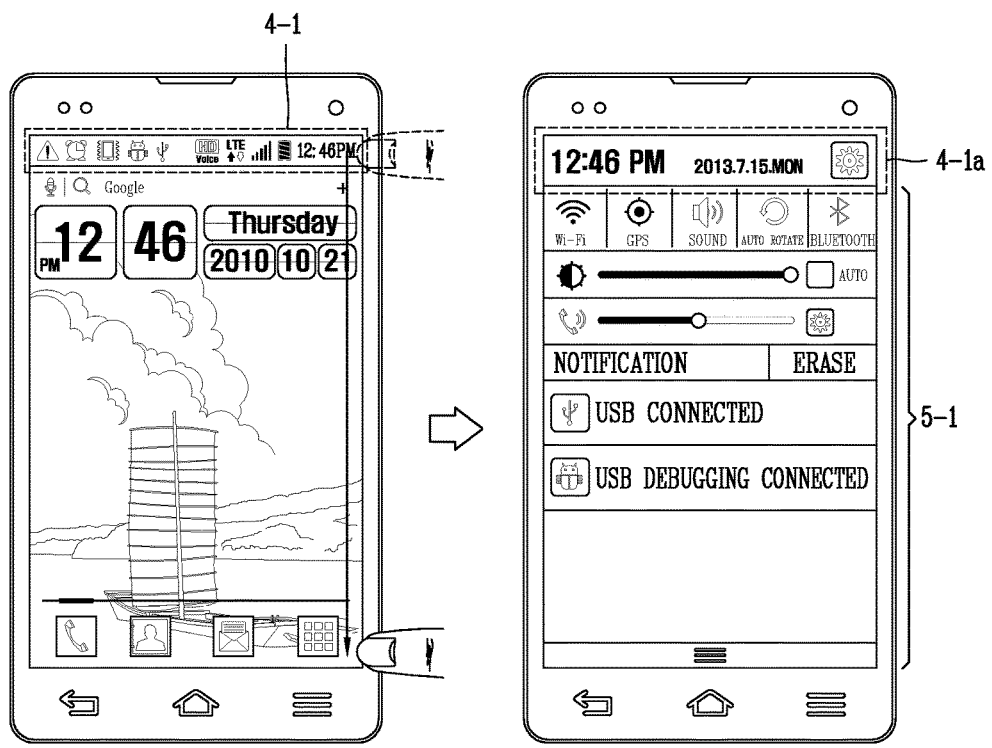
FIG. 5 is another exemplary view illustrating a method of changing (moving) the display position of at least one item according to a first embodiment of the present disclosure.

FIG. 5 is another exemplary view illustrating a method of changing (moving) the display position of at least one item according to a first embodiment of the present disclosure.

As illustrated in FIG. 5, when an upper notification bar containing the at least one or more items is dragged by a user, the controller 180 displays only partial items (for example, time and date) 4-1*a* of the at least one or more items on the upper notification bar, and displays a window 5-1 for changing the setting of the at least one or more items on the display unit 151. The user may change the display position of items to be displayed on the upper notification bar through the window 5-1. For example, when the display position of the items is changed through the window 5-1 and then the window 5-1 disappears by a user's drag input, the controller 180 displays the items within the upper notification bar according to the display position of the changed items.

The controller 180 may automatically repeat the process of displaying only partial items (for example, time and date) 4-1*a* of the items displayed on the upper notification bar in a periodic manner for a preset period of time to reduce the image sticking. The controller 180 may periodically display only partial items of the items on the display unit 151, and periodically change the display position of the partial items.

Figure 6:
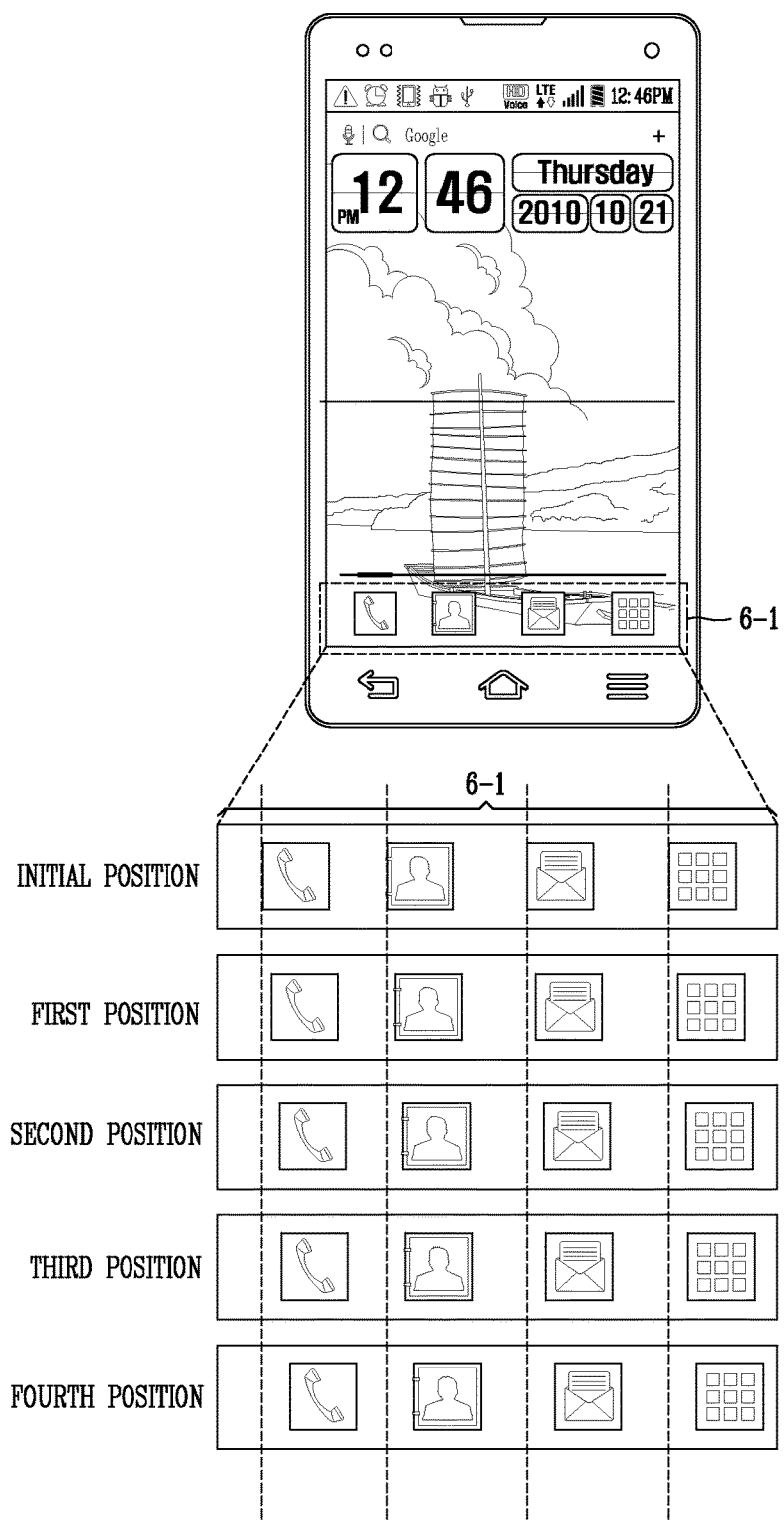
FIG. 6 is still another exemplary view illustrating a method of changing (moving) the display position of at least one item according to a first embodiment of the present disclosure.

FIG. 6 is still another exemplary view illustrating a method of changing (moving) the display position of at least one item according to a first embodiment of the present disclosure.

As illustrated in FIG. 6, the controller 180 may move the entire items arrangement including at least one or more items 6-1. For example, when a plurality of items are arranged in one row in a horizontal direction, the controller 180 may move the entire items to the left or right side whenever the turn-off number of times of the display unit 151 increases. The controller 180 may move part of the entire items 4-1 to the left side and the remaining part thereof to the right side whenever the turn-off number of times of the display unit 151 increases. The items 5-1 may be the application execution icons of the mobile terminal 100.

The controller 180 may move the items 4-1 from an initial position to a first position (for example, a position moved to the right side by 5 pixels) when the turn-off number of times of the display unit 151 is once, and move the items 4-1 from the first position to a second position (for example, a position moved downward by 5 pixels) when the turn-off number of times of the display unit 151 is twice, and move the items 4-1 from the second position to a third position (for example, a position moved to the left side by 5 pixels) when the turn-off number of times of the display unit 151 is three times, and move the items 6-1 from the third position to a fourth position (for example, a position moved upward by 5 pixels) when the turn-off number of times of the display unit 151 is four times.

The controller 180 may repeatedly move the items 6-1 from a fourth position to a first position and from the first position to the fourth position in a sequential manner whenever the turn-off number of times of the display unit 151 increases one over five times or repeatedly move the items 6-1 from a first position to a fourth position in a sequential manner whenever the turn-off number of times of the display unit 151 increases one over five times.

Accordingly, a control apparatus of a mobile terminal and a control method thereof according to a first embodiment of the present disclosure may display at least one or more items on a display unit in a turn-on state and then turn off the display unit, and move the display position of the at least one or more items displayed on the display unit in the turn-on state when the display unit is turned off, and display the at least one or more items at the moved display position when the display unit is turned back on, thereby effectively reducing the image sticking of the mobile terminal.

Figure 7:
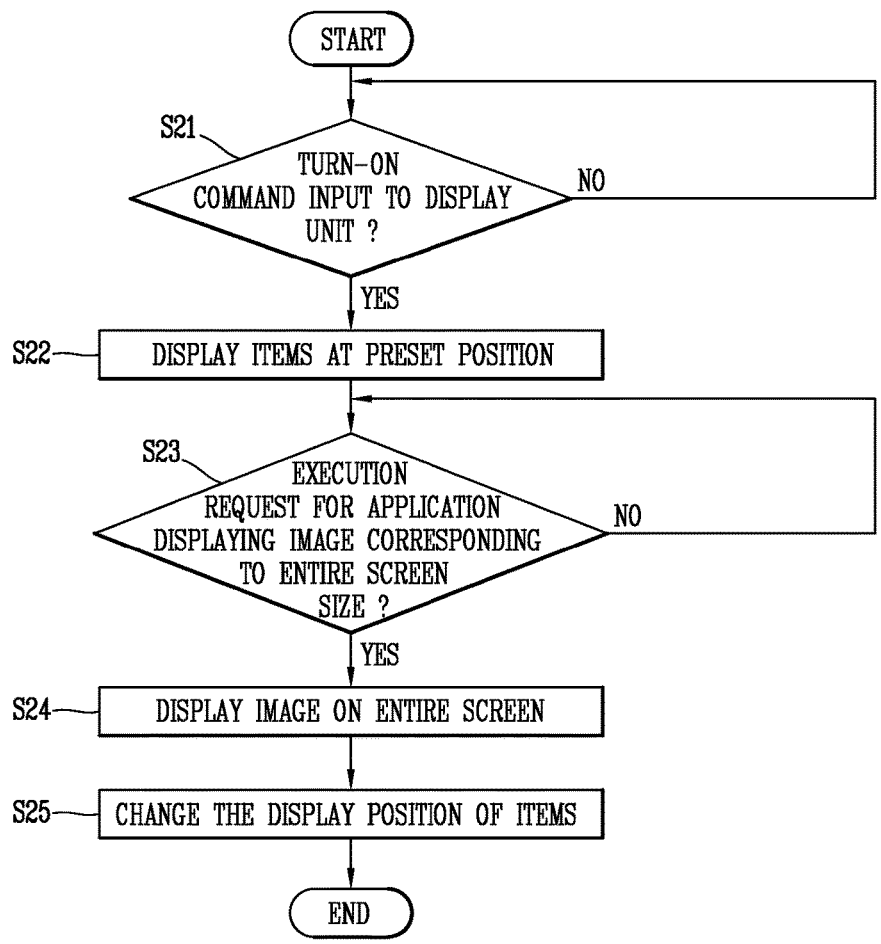
FIG. 7 is a flow chart illustrating a control method of a mobile terminal according to a second embodiment of the present disclosure.

FIG. 7 is a flow chart illustrating a control method of a mobile terminal according to a second embodiment of the present disclosure.

First, the controller 180 determines (decides) whether or not a turn-on command of the display unit 151 is entered through the input unit 130 (S21). A user may presses a turn-on/turn-off button key of the display unit 151 to enter a turn-on/turn-off command of the display unit 151. The controller 180 may recognizes a user's voice to turn on or off the display unit 151. The controller 180 may turn on or off the display unit 151 based on a preset user gesture entered through the camera 121 or gesture sensor 145. The controller 180 may automatically turn on or off the display unit 151 for each preset period of time.

When a turn-on command of the display unit 151 is received, the controller 180 turns on the display unit 151, and displays at least one item at a preset position on the display unit 151 (S22). When the at least one item is displayed on the display unit 151, the controller 180 may arrange and display them in a row in a predetermined region of the display unit 151. For example, the controller 180 may arrange and display items in a horizontal direction in a region having a predetermined thickness from an upper end of the display unit 151.

The controller 180 determines whether or not a signal for requesting to execute an application (application program) that displays an image corresponding to the entire screen size of the display unit 151 is received (S23). For example, when an icon for executing an application (application program) that displays an image corresponding to the entire screen size of the display unit 151 is selected, the controller 180 executes the application (application program).

When an application (application program) that displays an image corresponding to the entire screen size of the display unit 151 is carried out, the controller 180 displays an image corresponding to the entire screen size of the display unit 151 on the entire screen of the display unit 151 through the application (application program) (S24).

The controller 180 may display the image only for a preset period of time (for example, 30 minutes) for reducing the image sticking through the application (application program). For example, the controller 180 executes the application (application program) to display the image on a home image and then suspends the application (application program) when a preset period of time (for example, 30 minutes) for reducing the image sticking has passed to display the home image instead of the image.

Figure 8:
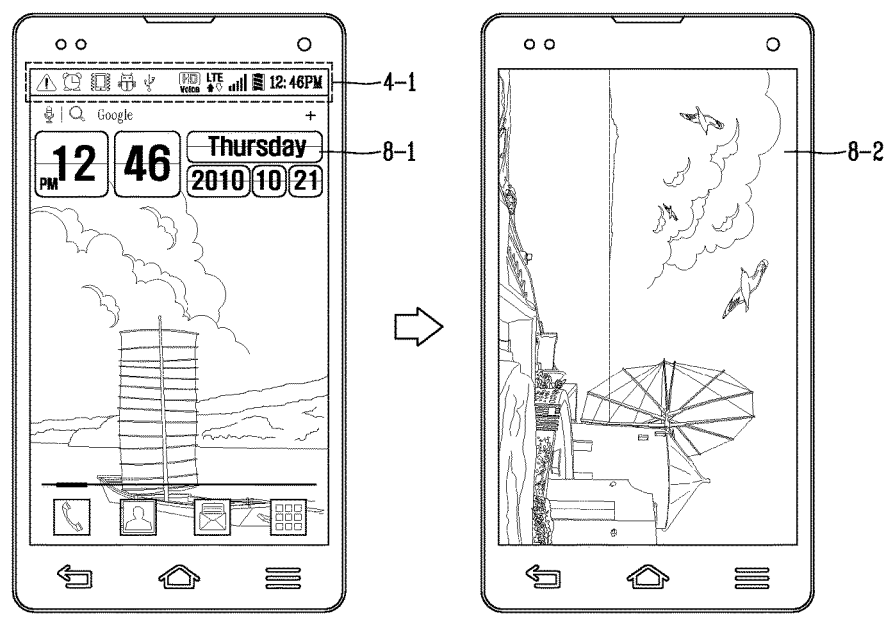
FIG. 8 is an exemplary view illustrating an image according to a second embodiment of the present disclosure.

FIG. 8 is an exemplary view illustrating an image according to a second embodiment of the present disclosure.

As illustrated in FIG. 8, when the application (application program) is carried out in a state that a home image 8-1 is displayed, the controller 180 displays the image 8-2 on the home image 8-1 and then suspends the application (application program) when a preset period of time (for example, 30 minutes) for reducing the image sticking has passed to display the home image 8-1 instead of the image 8-2. The controller 180 may count an execution number of times of the application (application program), and change the image 802 to a new image according to the counted number of times. The image 802 and new image may be set by a user or set by a designer.

The controller 180 may display an image (an image corresponding to the size of a region including the items 4-1) of the application (application program) on only an image corresponding to a region including the items (icons displayed at a fixed position) 4-1 for a preset period of time, thereby reducing image sticking due to the items 4-1.

The controller 180 displays the image 8-2 on the home image 8-1 only for a preset period of time (for example, 30 minutes) for reducing the image sticking or turns off the display unit 151, and then moves the display position of at least one item displayed on the display unit 151, and displays the at least one item at the moved display position (S25). The controller 180 may move the display position of at least one item displayed on the display unit 151 as illustrated in a first embodiment of the present disclosure.

Accordingly, a control apparatus of a mobile terminal and a control method thereof according to a second embodiment of the present disclosure may display a preset image for reducing for reducing image sticking instead of a home image containing at least one or more items for a preset period of time, and move the display position of the at least one or more items, and display the at least one or more items at the moved display position when the preset period of time has passed, thereby effectively reducing the image sticking of the mobile terminal.

Figure 9:
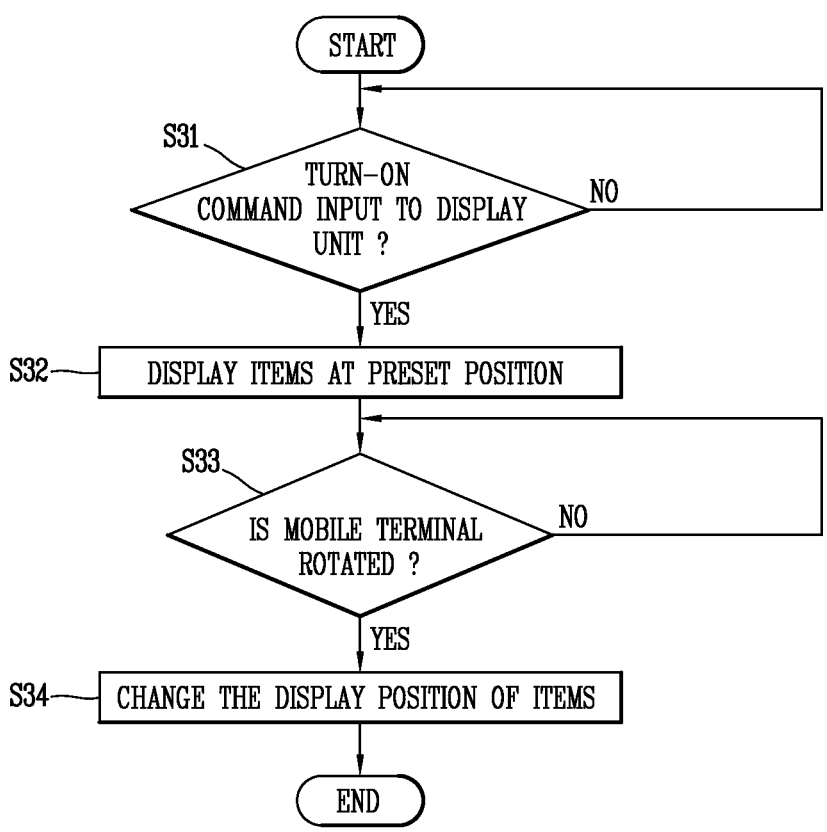
FIG. 9 is a flow chart illustrating a control method of a mobile terminal according to a third embodiment of the present disclosure.

FIG. 9 is a flow chart illustrating a control method of a mobile terminal according to a third embodiment of the present disclosure.

First, the controller 180 determines (decides) whether or not a turn-on command of the display unit 151 is entered through the input unit 130 (S31). A user may presses a turn-on/turn-off button key of the display unit 151 to enter a turn-on/turn-off command of the display unit 151. The controller 180 may recognizes a user's voice to turn on or off the display unit 151. The controller 180 may turn on or off the display unit 151 based on a preset user gesture entered through the camera 121 or gesture sensor 145. The controller 180 may automatically turn on or off the display unit 151 for each preset period of time.

When a turn-on command of the display unit 151 is received, the controller 180 turns on the display unit 151, and displays at least one item at a preset position on the display unit 151 (S32). When the at least one item is displayed on the display unit 151, the controller 180 may arrange and display them in a row in a predetermined region of the display unit 151. For example, the controller 180 may arrange and display items in a horizontal direction in a region having a predetermined thickness from an upper end of the display unit 151.

The controller 180 determines whether a screen horizontal view mode or screen vertical view mode is selected based on the rotation information of the mobile terminal 100 (S33).

The controller 180 changes the display position of the items 4-1 according to the screen horizontal view mode or the screen vertical view mode (S34).

Figure 10A:
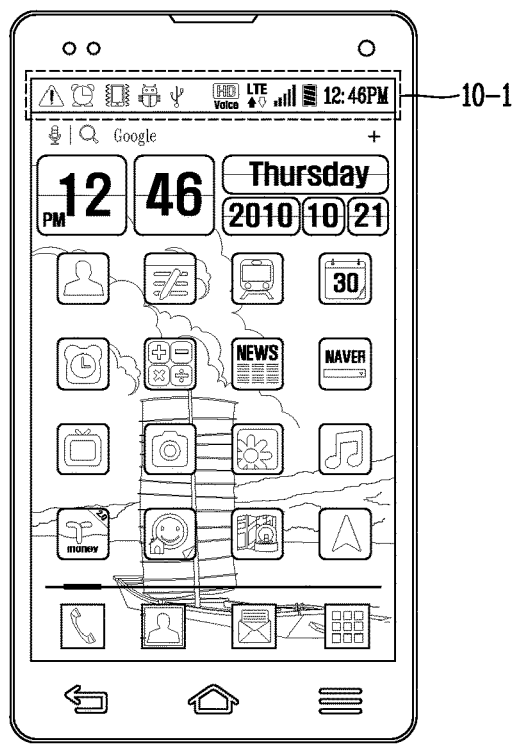
FIGS. 10A and 10B are exemplary views illustrating a method of changing the display position of items according to the rotation of a mobile terminal according to a third embodiment of the present disclosure.
Figure 10B:
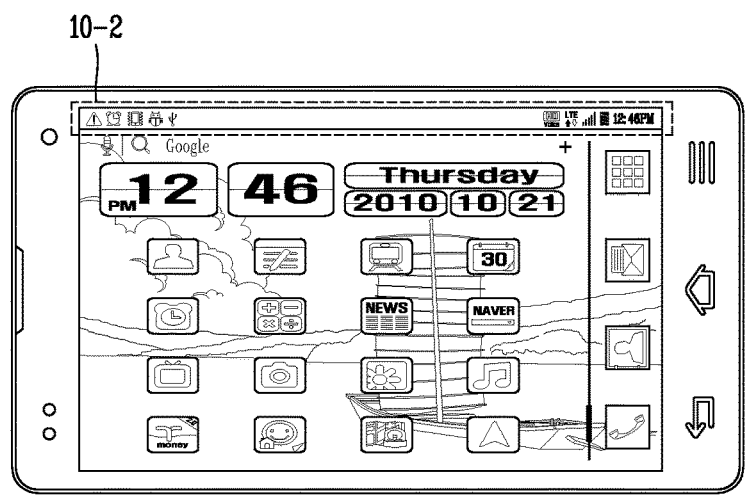

FIGS. 10A and 10B are exemplary views illustrating a method of changing the display position of items according to the rotation of a mobile terminal according to a third embodiment of the present disclosure.

As illustrated in FIGS. 10A and 10B, when the mobile terminal 100 is switched from the screen vertical view mode to the screen horizontal view mode, the controller 180 changes the display position 10-1 of the items to reference numeral 10-2 as shown in FIG. 10B. When the mobile terminal 100 is switched from the screen horizontal view mode to the screen vertical view mode, the controller 180 changes the display position 10-2 of the items to reference numeral 10-1.

The controller 180 may move the display position of the items by the preset distance (for example, 1 pixel to 5 pixels) as illustrated in the first embodiment of the present disclosure whenever the screen view mode is switched to the screen vertical view mode or the screen horizontal view mode. The controller 180 may repeatedly move the items 4-1 from a fifth position to a first position and from the first position to the fifth position in a sequential manner whenever the screen view mode is switched to the screen vertical view mode or the screen horizontal view mode or repeatedly move the items 4-1 from a first position to a fifth position in a sequential manner whenever the screen view mode is switched to the screen vertical view mode or the screen horizontal view mode.

The controller 180 may sense an acceleration of the mobile terminal 100 through the sensing unit 140, and repeatedly move the items 4-1 from the fifth position to the first position and from the first position to the fifth position in a sequential manner whenever the sensed acceleration exceeds a preset reference value or repeatedly move the items 4-1 from the first position to the fifth position whenever the sensed acceleration exceeds a preset reference value.

Accordingly, a control apparatus of a mobile terminal and a control method thereof according to a third embodiment of the present disclosure may change the display position of the at least one or more items whenever a screen vertical view mode or screen horizontal view mode of the mobile terminal is selected, thereby effectively reducing the image sticking of the mobile terminal.

A control apparatus of a mobile terminal and a control method thereof according to a third embodiment of the present disclosure may move the display position of the at least one or more items by a preset distance whenever a screen vertical view mode or screen horizontal view mode of the mobile terminal is selected, thereby effectively reducing the image sticking of the mobile terminal.

Figure 11:
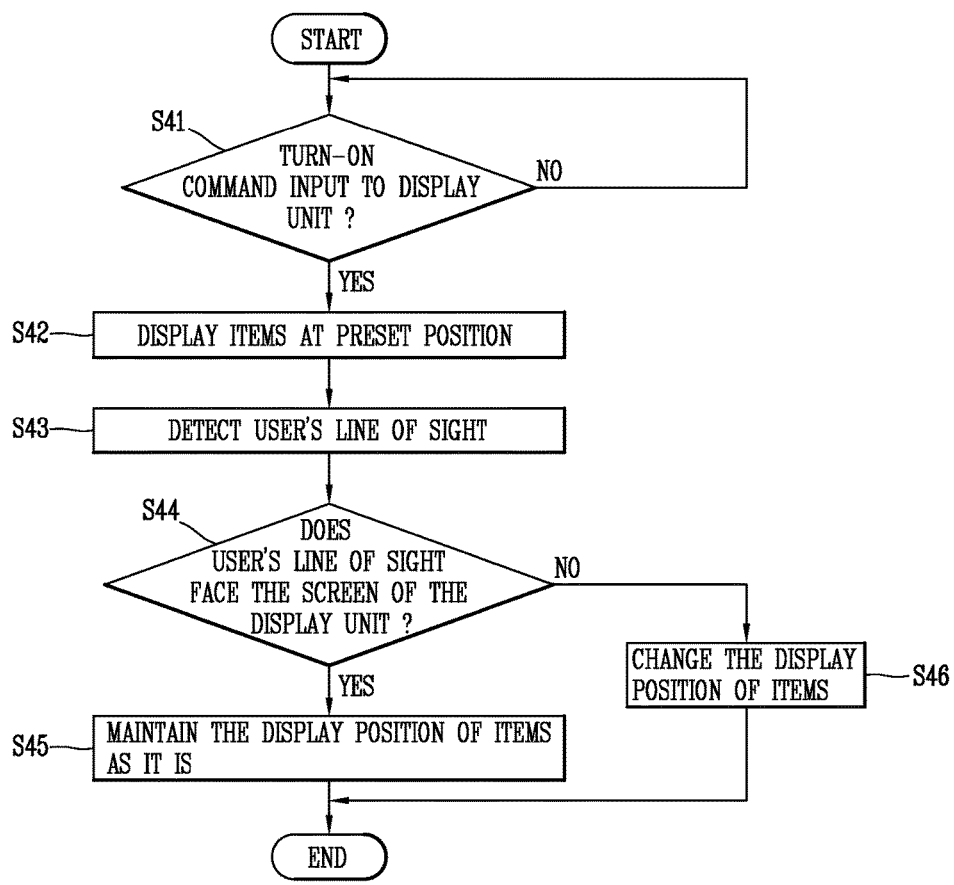
FIG. 11 is a flow chart illustrating a control method of a mobile terminal according to a fourth embodiment of the present disclosure.

FIG. 11 is a flow chart illustrating a control method of a mobile terminal according to a fourth embodiment of the present disclosure.

First, the controller 180 determines (decides) whether or not a turn-on command of the display unit 151 is entered through the input unit 130 (S41). A user may presses a turn-on/turn-off button key of the display unit 151 to enter a turn-on/turn-off command of the display unit 151. The controller 180 may recognizes a user's voice to turn on or off the display unit 151. The controller 180 may turn on or off the display unit 151 based on a preset user gesture entered through the camera 121 or gesture sensor 145. The controller 180 may automatically turn on or off the display unit 151 for each preset period of time.

When a turn-on command of the display unit 151 is received, the controller 180 turns on the display unit 151, and displays at least one item at a preset position on the display unit 151 (S42). When the at least one item is displayed on the display unit 151, the controller 180 may arrange and display them in a row in a predetermined region of the display unit 151. For example, the controller 180 may arrange and display items in a horizontal direction in a region having a predetermined thickness from an upper end of the display unit 151.

The controller 180 detects a user's line of sight through the camera 121 (S43). The method of detecting a user's line of sight is a publicly known technology, and thus the detailed description thereof will be omitted.

The controller 180 determines whether or not the detected user's line of sight faces the screen side of the display unit 151 (S44). For example, the controller 180 determines whether the detected user's line of sight faces the screen side of the display unit 151 or does not face the screen side of the display unit 151.

The controller 180 does not move the items when the detected user's line of sight faces the screen side of the display unit 151 (S45), but moves the items by the preset distance only when the detected user's line of sight does not face the screen side of the display unit 151 (S46) not to allow the user to recognize the movement of the items. In other words, the controller 180 detects the user's line of sight through the camera 121, and displays the items at the moved display position only when the detected user's line of sight does not face the screen of the display unit 151.

The controller 180 may move the items according to the turn-off number of times of the display unit 151 only when the detected user's line of sight does not face the screen side of the display unit 151.

The controller 180 may display the image 8-2 on the display unit 151 only when the detected user's line of sight does not face the screen side of the display unit 151.

The controller 180 may move the items based on the detected acceleration only when the detected user's line of sight does not face the screen side of the display unit 151.

The controller 180 may move the items according to the screen view mode of the mobile terminal only when the detected user's line of sight does not face the screen side of the display unit 151.

Accordingly, a control apparatus of a mobile terminal and a control method thereof according to a fourth embodiment of the present disclosure may detect a user's line of sight through a camera, and display the items at the moved display position only when the detected user's line of sight does not face the screen of the display unit, thereby effectively reducing the image sticking of the mobile terminal while disallowing a user to recognize the movement of the items.

Figure 12:
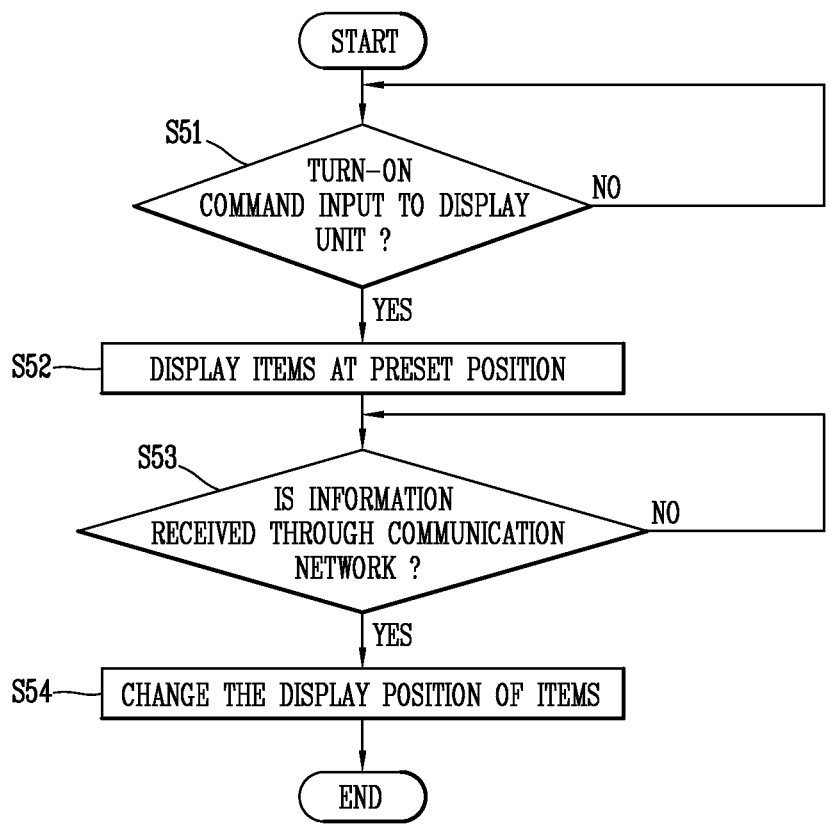
FIG. 12 is a flow chart illustrating a control method of a mobile terminal according to a fifth embodiment of the present disclosure.

FIG. 12 is a flow chart illustrating a control method of a mobile terminal according to a fifth embodiment of the present disclosure.

First, the controller 180 determines (decides) whether or not a turn-on command of the display unit 151 is entered through the input unit 130 (S51). A user may presses a turn-on/turn-off button key of the display unit 151 to enter a turn-on/turn-off command of the display unit 151. The controller 180 may recognizes a user's voice to turn on or off the display unit 151. The controller 180 may turn on or off the display unit 151 based on a preset user gesture entered through the camera 121 or gesture sensor 145. The controller 180 may automatically turn on or off the display unit 151 for each preset period of time.

When a turn-on command of the display unit 151 is received, the controller 180 turns on the display unit 151, and displays at least one item at a preset position on the display unit 151 (S52). When the at least one item is displayed on the display unit 151, the controller 180 may arrange and display them in a row in a predetermined region of the display unit 151. For example, the controller 180 may arrange and display items in a horizontal direction in a region having a predetermined thickness from an upper end of the display unit 151.

The controller 180 determines (decides) whether or not information has been received through the wireless communication unit 110 (S53). For example, the controller 180 determines (decides) whether or not a text, a call signal or the like is received through the wireless communication unit 110.

When information is received through the wireless communication unit 110, the controller 180 changes the display position of the items (S54). For example, the controller moves the display position of the items 4-1 by a preset distance whenever a text or call signal is received through the wireless communication unit 110.

The controller 180 may also move the display position of the items by the preset distance (for example, 1 pixel to 5 pixels) whenever a text or call signal is received through the wireless communication unit 110 as illustrated in the first embodiment of the present disclosure. The controller 180 may repeatedly move the items 4-1 from a fifth position to a first position and from the first position to the fifth position in a sequential manner whenever a text or call signal is received through the wireless communication unit 110 or repeatedly move the items 4-1 from a first position to a fifth position in a sequential manner whenever a text or call signal is received through the wireless communication unit 110.

Accordingly, a control apparatus of a mobile terminal and a control method thereof according to a fifth embodiment of the present disclosure may display the items at the moved display position whenever a text or call signal is received through the wireless communication unit 110, thereby effectively reducing the image sticking of the mobile terminal.

As described above, a control apparatus of a mobile terminal and a control method thereof according to the embodiments of the present disclosure may display at least one or more items on a display unit in a turn-on state and then turn off the display unit, and move the display position of the at least one or more items displayed on the display unit in the turn-on state when the display unit is turned off, and display the at least one or more items at the moved display position when the display unit is turned back on, thereby effectively reducing the image sticking of the mobile terminal.

A control apparatus of a mobile terminal and a control method thereof according to the embodiments of the present disclosure may display a preset image for reducing for reducing image sticking instead of a home image containing at least one or more items for a preset period of time, and move the display position of the at least one or more items, and display the at least one or more items at the moved display position when the preset period of time has passed, thereby effectively reducing the image sticking of the mobile terminal.

A control apparatus of a mobile terminal and a control method thereof according to the embodiments of the present disclosure may change the display position of the at least one or more items whenever a screen vertical view mode or screen horizontal view mode of the mobile terminal is selected, thereby effectively reducing the image sticking of the mobile terminal.

A control apparatus of a mobile terminal and a control method thereof according to the embodiments of the present disclosure may move the display position of the at least one or more items by a preset distance whenever a screen vertical view mode or screen horizontal view mode of the mobile terminal is selected, thereby effectively reducing the image sticking of the mobile terminal.

A control apparatus of a mobile terminal and a control method thereof according to the embodiments of the present disclosure may detect a user's line of sight through a camera, and display the items at the moved display position only when the detected user's line of sight does not face a screen of the display unit, thereby effectively reducing the image sticking of the mobile terminal while disallowing a user to recognize the movement of the items.

A control apparatus of a mobile terminal and a control method thereof according to the embodiments of the present disclosure may display the items at the moved display position whenever a text or call signal is received through the wireless communication unit, thereby effectively reducing the image sticking of the mobile terminal.

It will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the technical concept within the equivalent scope of the invention should be construed to be included in the scope of the right of the present invention.

What is claimed is:

1. A control apparatus for reducing image sticking in a mobile terminal, the apparatus comprising:

a display configured to display items on one portion of an entire display area; and a controller configured to:

receive a first display turn-on command;

turn the display on and display the items, each of the items displayed at a corresponding first position;

receive a display turn-off command while the items are displayed;

turn the display off and change a display position at which each of the items is displayed;

receive a second display turn-on command;

turn the display back on and display the items at the changed display position such that each of the items is displayed at a corresponding second position different from the first position;

receive a command requesting execution of an application that displays an image corresponding to the entire display area;

execute the application during a preset period of time to control the display to display the image corresponding to the entire display area on the entire display area including the one portion;

determine a number of times the application is executed; and control the display to change the displayed image to a new image according to the determined number of times.

2. The control apparatus of claim 1, wherein the controller is further configured to:

determine a number of times the display is turned off; and sequentially change the display position according to the determined number of times such that the display position is moved incrementally as the count increases.

3. The control apparatus of claim 1, wherein the displayed items are icons indicating current status of the mobile terminal.

4. The control apparatus of claim 3, wherein the icons comprise at least a mobile communication network reception sensitivity display icon, a long term evolution (LTE) or WiFi reception sensitivity display icon, a current time display icon, a battery information display icon, an alarm setting display icon, a Bluetooth status display icon, or a global positioning system (GPS) status display icon.

5. The control apparatus of claim 4, wherein the controller is further configured to control the display to:

display a preset image for a preset period of time instead of a first image corresponding to a region in which the items are displayed; and change the display position and re-display the items at the changed display position when the preset period elapses.

6. The control apparatus of claim 1, wherein the controller is further configured to control the display to:

display a preset image for a preset period of time instead of the items; and change the display position and re-display the items at the changed display position when the preset period elapses.

7. The control apparatus of claim 1, wherein the controller is further configured to control the display to:

periodically display only a portion of the items; and periodically change the display position.

8. The control apparatus of claim 1, wherein the controller is further configured to control the display to change the display position by a preset distance when the mobile terminal transitions between a vertical view mode and a horizontal view mode.

9. The control apparatus of claim 1, further comprising a sensor configured to sense acceleration of the mobile terminal, wherein the controller is further configured to control the display to change the display position by a preset distance when the sensed acceleration exceeds a preset value.

10. The control apparatus of claim 1, further comprising a camera, wherein the controller is further configured to:

detect a user's line of sight via the camera; and control the display to display the items at the changed display position only when the detected line of sight does not face a screen of the display.

11. The control apparatus of claim 1, further comprising a wireless communication unit configured to receive information, wherein the controller is further configured to control the display to change the display position when the information is received.

12. The control apparatus of claim 1, further comprising a wireless communication unit configured to receive information, wherein the controller is further configured to control the display to change the display position by a preset distance when a text or call signal is received via the wireless communication unit.

13. A method for reducing image sticking on a display of a mobile terminal, the method comprising:

receiving a first display turn-on command;

turning the display on and displaying items on one portion of an entire display area of the display, each of the items displayed at a corresponding first position;

receiving a display turn-off command while the items are displayed;

turning the display off and changing a display position at which each of the items is displayed;

receive a second display turn-on command;

turning the display back on and displaying the items at the changed display position such that each of the items is displayed at a corresponding second position different from the first position;

receiving a command requesting execution of an application that displays an image corresponding to the entire display area;

executing the application during a preset period of time to display the image corresponding to the entire display area on the entire display including the one portion;

determining a number of times the application is executed; and changing the displayed image to a new image according to the determined number of times.

14. The method of claim 13, further comprising:

determining a number of times the display is turned off; and sequentially changing the display position according to the determined number of times such that the display position is moved incrementally as the count increases, wherein the displayed items are icons indicating current status information of the mobile terminal.

15. The method of claim 14, wherein the icons comprise at least a mobile communication network reception sensitivity display icon, a long term evolution (LTE) or WiFi reception sensitivity display icon, a current time display icon, a battery information display icon, an alarm setting display icon, a Bluetooth status display icon, or a global positioning system (GPS) status display icon.

16. The method of claim 15, further comprising:

displaying a preset image for a preset period of time instead of the items; and changing the display position and re-displaying the items at the changed display position when the preset period elapses.

17. The method of claim 13, further comprising:
displaying a preset image for a preset period of time instead of a first image corresponding to a region in which the items are displayed; and
changing the display position and re-displaying the items at the changed display position when the preset period elapses.

18. The method of claim 13, further comprising:
periodically displaying only a portion of the items; and
periodically changing the display position.

19. The method of claim 13, further comprising changing the display position by a preset distance when the mobile terminal transitions between a vertical view mode and a horizontal view mode.

20. The method of claim 13, further comprising:
sensing acceleration of the mobile terminal; and
changing the display position by a preset distance when the sensed acceleration exceeds a preset value.

* * * * *